April 18, 1939.                A. J. HORTON                    2,155,013
       OPTICAL DEVICE FOR PRODUCING A SUBSTANTIALLY STATIONARY
         IMAGE OF SUCCESSIVE SIMILAR AREAS ON A RUNNING WEB
                  Filed Aug. 6, 1935         2 Sheets-Sheet 1
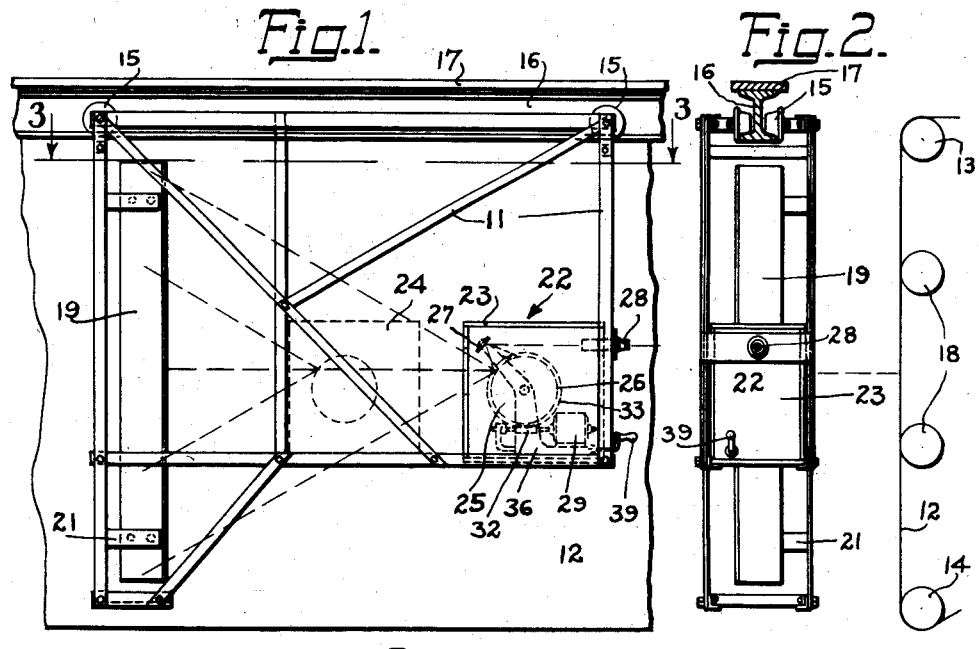
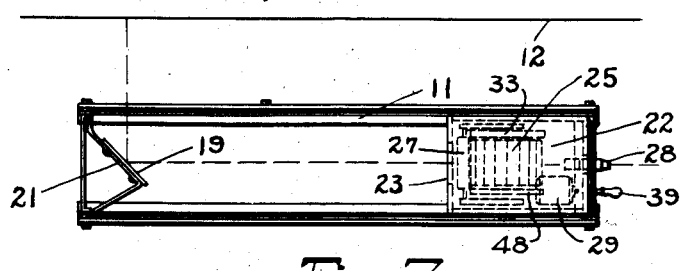
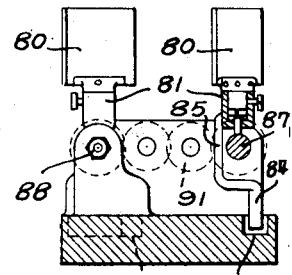
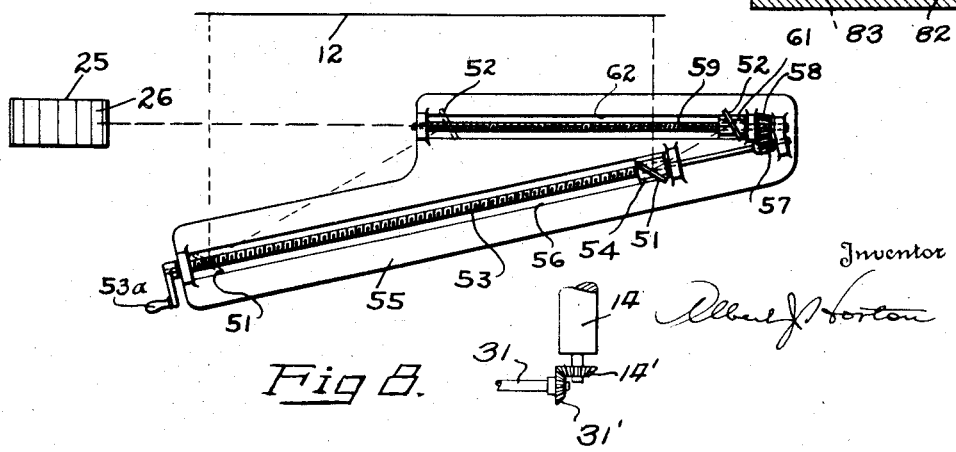

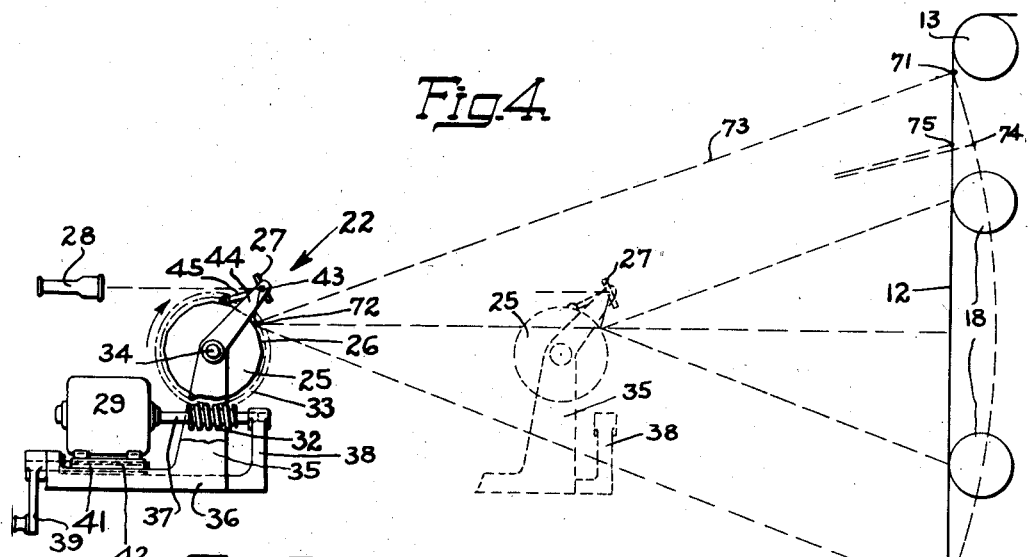

Patented Apr. 18, 1939

2,155,013

UNITED STATES PATENT OFFICE 2,155,013

OPTICAL DEVICE FOR PRODUCING A SUBSTANTIALLY STATIONARY IMAGE OF SUCCESSIVE SIMILAR AREAS ON A RUNNING WEB

Albert J. Horton, White Plains, N. Y., assignor to R. Hoe & Co., Inc., New York, N. Y., a corporation of New York Application August 6, 1935, Serial No. 34,886

13 Claims. (Cl. 88—14)

This invention relates to devices for observing impressions on a moving web or sheet, and more particularly to such a device adapted for use in inspecting the registration of printed impressions on a running web in a printing machine in which the web is rewound into a roll.

In printing processes where the printed web is rewound into a roll, it is desirable that an inspection be made of the alignment and registration of the printed impressions before rewinding, and when the web is traveling at high speed, such inspection is impossible by direct observation of the moving web. In multi-color printing, wherein the impressions from one printing cylinder must register with those from another, frequent inspection is required in order to be certain that the impressions register and are correctly aligned, so that printing of high quality will be produced.

The improvements contemplated by this invention are particularly applicable to devices whereby successive marks or impressions on the printed and running web are reflected (just prior to its being rewound), to a stationary viewpoint by a suitable reflecting member which is moved in synchronism with the running web so that the aforesaid marks or impressions will appear stationary and thereby permit close inspection thereof. A device of this kind is disclosed in applicant's pending application Serial Number 743,214, filed September 8, 1934, and the mechanism herein shown and described includes certain refinements that resulted from further development of the invention previously disclosed.

One of the principal objects of this invention is to provide improved means to inspect the registration of a succession of regularly appearing printed impressions on a running web.

Another object is to provide a mechanism, having the above mentioned means included in its structure, and whereby the same may be moved transversely relatively to the running web to observe and inspect any portion thereof across the same and to be disposed in a position convenient to the observer.

Still another object is to provide mechanism for the stated purpose, whereby successive portions of impressions appearing more than once per printing cylinder revolution may be inspected.

A further object is to provide means to compensate for and rectify optical errors incident to the operation of devices of this description.

With the foregoing and other objects in view, which will appear as the description proceeds, the invention resides in the combination and arrangement of parts, and in the details of construction hereinafter described and claimed.

The preferred embodiment of the invention is illustrated in the accompanying drawings, wherein:

Figure 1 is an elevational view of a mechanism embodying the features of this invention, and which is shown disposed in operative relation to a running web of a printing machine;

Figure 2 is an end view of the same;

Figure 3 is a sectional view on line 3—3 of Figure 1;

Figure 4 is an elevational view of the main elements of the mechanism with a diagrammatic showing of its operation;

Figure 5 is an enlarged detail view of the cooperating reflecting members and showing the optical error compensating and rectifying means associated therewith;

Figure 6 is a front face view of the parts shown in Figure 5;

Figure 7 shows a somewhat modified form of mechanism embodying certain features of this invention;

Figure 8 is a diagrammatic view depicting the drive connection between a driven web roller and the rotary reflecting member;

Figure 9 shows another modified form of mechanism embodying certain features of this invention; and Figure 10 is a sectional view taken on the line 10—10 of Figure 9.

The mechanism illustrated in Figures 1, 2, and 3 comprises a supporting frame 11 mounted for movement transversely in front of the path of a web 12, which is led from a printing machine and passes around guide rollers 13 and 14, from whence it is directed to a rewinding device (not shown). To facilitate the movement of the frame 11, a pair of rollers 15 is provided at each end thereof which are adapted to support the frame 11 upon a track 16 secured to an adjacent beam 17. Additional guide rollers 18 may be provided in back of the web 12 to steady it and prevent it vibrating during its travel between the rollers 13 and 14. The rollers 13 and 14, it will be understood may be driven parts of the machine operating upon the web 12 to feed the web to the rewinder.

A light reflecting member or mirror 19 is mounted at one end of the frame 11 by brackets 21 in position to receive and reflect the light rays from impressions upon the printed web 12 to an image observing means 22. The observing means 22 is preferably enclosed within a box 23 which is mounted upon the frame 11 adjacent the end thereof, opposite the mirror 19. The observing means 22 may be mounted upon frame 11 for movement toward and away from the mirror 19 so that it may be moved into the position indicated by the dotted lines 24. The mirror 19 is of sufficient length to reflect light rays from a lengthwise strip of the web 12, that is at least equal in length to the circumference of a form cylinder of the printing machine, and the frame 11 is permitted sufficient movement across the web 12 to permit the mirror 19 to be properly positioned to reflect the light rays from a spot in any desired widthwise area from one edge of the web to the other. As illustrated, the face of the mirror 19 is disposed at an angle to the web 12 so as to reflect the light rays to a point along a line parallel to the face of the web.

The impression observing means 22, enclosed in the box 23 in Figure 1, and shown in larger scale in Figures 4, 5, and 6, comprises a rotor 25, having a plurality of light reflecting surfaces or mirrors 26 upon its periphery, a rectifying member or mirror 27, and an image magnifying device 28. The rotor 25 is rotated in synchronism with the printing machine to cause each of the reflecting surfaces to follow a desired impression on the web 12 during its travel from roller 13 to roller 14. The rotor may be rotated by means of a motor 29 of the kind shown in the hereinbefore mentioned prior application, or by a chain or a flexible shaft 31, driven from the printing machine, either means serving to rotate a worm 32 and worm wheel 33, the latter being secured on the shaft 34, supporting the rotor 25. The shaft 34 is journaled in standards 35, extending upwardly from a base 36 which may be secured to the box 23 or directly mounted upon suitable supporting means for movement toward and away from either the mirror 19 of Figure 1, or the web 12 of Figure 4.

It will be understood that the flexible shaft 31, or chain drive, when used, is drivingly connected to a suitable rotating member of the machine, which may be the roller 14, as depicted in Figure 8, so that the worm 32, and therefore the worm wheel 33 and rotor 25 will be rotated at the proper speed. A preferred mechanism for connecting the flexible shaft 31 to the driven web guide roller 14, or other rotating component of the printing machine, includes a beveled gear 14' secured for rotation with the roller 14 and meshing with a similar beveled gear 31' secured to the flexible shaft 31 for rotation therewith.

The motor 29 shown in Figure 4, and the flexible shaft 31 shown in Figure 6, are mounted upon the base 36 with provision for movement from right to left as shown in Figures 4 and 6, and vice versa, and transmit this movement to the worm 32. The motor shaft 37 has its outer terminal journaled in a bearing 38 formed as part of the base 36 and is mounted for axial movement in this bearing. The above movement of motor 29 and shaft 37 may be obtained by rotating a handle 39 secured to a screw 41, which is journaled in the base 36 and threadingly engages a motor support 42. Axial movement of the worm 32, will cause it to operate as a rack in respect to the gear 33 and the rotor may thus be advanced or retarded to bring a spot in any desired area lengthwise of the web into view.

In the form depicted in Figure 6, the worm shaft 37' is mounted for rotation and axial movement in the bearing 38 and for rotation in a movable bearing 42' which is movable relative to the base 36 and is actuated by the screw mechanism which moves the motor support 42. The shaft 37' is held against axial movement relative to the bearing 42' so that movement of the bearing, similar to the described movement of the motor support 42, moves the shaft 37' axially in the bearing 38 to advance or retard the reflecting rotor, as hereinbefore disclosed. If desired, the adjusting mechanism may be modified to move the worm 32 along a feather on the shaft 37, which latter would then be held against axial movement.

The light rays received by the reflecting surfaces 26 are reflected therefrom to the rectifying mirror 27 which is supported upon a rock shaft 43 journaled at its ends in extensions 44 of the standards 35. The shaft 43 may be rocked by a lever 45, one end of which is secured to the shaft, while the other end carries a cam roller 46 retained in engagement with the cam surface 47 of a cam 48. The cam 48 is secured to shaft 34 and rotates therewith. A spring 49 having an end secured to the lever 45 and the other end to an extension 44 maintains the roller 46 in operable engagement with the cam surface 47. The rectifying function of this portion of the mechanism will be hereinafter explained. The image magnifying device 28 receives the reflected light rays from the mirror 27 and by enlarging the images, assists the observer in their inspection.

The impression observing means 22 in the arrangements shown in Figures 1 and 4 require movement transversely of the web in order to view the desired impression. In many instances, the disposition of the means 22 within the frame of the printing machine may be inconvenient, objectionable, or due to lack of space, impossible, and if desired, an arrangement such as shown in Figure 7 may be provided. In this arrangement, the rotor 25 is disposed to one side of the printed web 12 and light rays from the impressions on the web are reflected to the reflecting surfaces thereof, by means of cooperating light reflecting members or mirrors 51 and 52. The mirror 51 is adapted to receive the light rays from the impression on the web.

The mirrors are so arranged with respect to the web 12, rotor 25, and to each other, that the light rays received by mirror 51 are reflected to mirror 52, and thence to the surfaces 26 of the rotor. In order to inspect any desired impression across the web 12, the mirror 51 is moved transversely of the web by a feed screw 53 threadingly engaging a base member 54, upon which the mirror 51 is mounted. The feed screw 53 is journaled at both ends in a stationary part 55 and a guide slot or groove 56 is provided in the said part in which the base 54 is slidable. A handle 53a may be provided to rotate the screw 53.

As the sum of the distance between the web 12 and the mirror 51, the distance between the mirrors 51 and 52, and the distance between the mirror 52 and the surface 26 must remain constant for best operating conditions, provision for maintaining it so is provided by a gear 57, secured to the end of the screw 53 and meshing with a gear 58 secured to the end of a similar screw 59, which is journaled at both ends thereof to the part 55. The screw 59, threadingly engages a base 61 for the mirror 52, which base slides in a groove 62 also formed in the part 55. Rotation of screw 53 to move the mirror 51 will rotate the screw 59 through the gears 57 and 58, and move the mirror 52 also, the gears and screws being so proportioned that the movement of the mirrors will maintain the sum of the above mentioned distances at a constant value.

In the arrangement shown in Figure 7, the paths of movement of the vertical mirrors 51 and 52 are arranged as shown, in order that the angular positions of the mirrors may be fixed with respect to their carrying bases, but it is obvious that these mirrors may be arranged to move in parallel planes if the mechanism shown in Figures 9 and 10 is provided to turn them as they are moved, and thus direct the light rays to the proper points. This mechanism includes means for pivoting the vertical mirrors 80 to turn in their bases 81 by providing suitably grooved ways 82 and 83 adjacent the paths of the respective mirrors and a follower 84, on an arm 85 connected to each mirror by an interposed arm 86 and running in a groove. The bases 81 of the mirrors 80 are mounted on parallel threaded rods 87 and 88, adapted to be rotated by a handle 89 and connected together by gearing 91. As in the form shown in Figure 7, the gears 91 and the threaded rods 87 and 88 are so proportioned that the movement of the mirrors 80 will maintain the sum of the above mentioned distances at a constant value. It is obvious that by such means, the vertical mirrors could be turned as they are moved in parallel planes and the light rays properly directed.

The provision shown in Figure 1 whereby the observing means 22 is movable toward and away from the mirror 19, or as in Figure 4, the web 12, reduces or increases the range of the reflecting surfaces 26 as desired. A change in position of the means 22 is required when the same impressions occur at regular intervals, but at greater or lesser spacing along the web. For example, when the form cylinders of the printing machine each carry forms that are printed but once during each revolution of the form cylinder, the length of web run scanned by the device must equal the circumferential dimension of the form cylinder, but when the form cylinders are each provided with two identical forms, each extending half way around the cylinder, the impressions will occur on the web at twice the frequency, and this condition permits the movement of the observing means 22 closer to the web 12, or mirror 19, and the speed of rotation of member 25 to be increased, the distance between the reflecting surface 26 and the web or mirror being reduced by half and the speed of the rotation doubled. The position of the observing means shown in dotted lines in Figure 4 represents the latter condition, where the web run scanned is shorter. It is obvious that variation in the size of the form cylinders will also necessitate corresponding variation of the length of web run scanned and consequently variation of the distance of the device from the web, for the angle embraced between the upper and lower dotted lines in Figure 4 is determined by the number of mirror faces on the rotor and does not change. When adjustments are properly made, the appearing and disappearing images match perfectly.

The function of the image rectifying mechanism which includes the oscillating mirror 27 and its operating members hereinbefore described, is to correct optical errors that would be present in the image seen in the magnifier 28 if the mirror 27 remained stationary. One factor that produces an error is that the path of the web where it is scanned by the device is a straight line and forms the chord of the sector across which the beam of light carrying the image to the rotor sweeps.

The light rays from a spot at 71, (Figure 4), strike one of the rotor mirrors 26 at a point 72 as indicated by line 73. Using the length of line 73 as a radius, when the rotor mirror has moved, for a certain period of time, the beam of light will have traveled through a certain angle, and if the web were not present it would strike the point 74. The motion of the web in the same time will carry it from the point 71 to the point 75, which is seen to be some distance from the point at which a beam from the point 74 would intersect the path of the web. This condition causes a slight vertical reciprocation of the observed image which is repeated as each impression passes through the field of view. Another factor that would produce some error is caused by the motion of the mirror faces 26 in an arc about the rotor axis, and this is superimposed on the error previously mentioned.

The contour of the cam surface 47 is so formed that the rocking motion imparted to the mirror 27 corrects these and other optical errors that would otherwise be present, and the rapidly moving successive images viewed through the magnifying means 28 appear to be absolutely stationary, and the slightest faults in register of the printing may easily be seen.

It will be understood that the invention may be embodied in other specific forms without departing from the spirit or essential attributes thereof, and it is therefore desired that the present embodiments be considered in all respects as illustrative and not restrictive, reference being had to the claims rather than to the foregoing description to indicate the scope of the invention.

What I claim is:

1. In a mechanism for observing printed impressions on a running web and adapted to operate in timed relation with the running web, a first rotary member by which the web is driven, a rotary reflecting member having a worm wheel operably connected thereto, a rotatably driven worm in mesh with the worm wheel and operably connected to the first member to drive the reflecting member, and means to move the worm axially and thereby vary the relation of the reflecting member to the first member.

2. In combination with a mechanism for observing printed impressions on a running web and operable in timed relation with the running web, a rotatable reflecting member having a worm wheel operably connected thereto, a web driving member, a rotatable worm in mesh with said worm wheel and rotatably driven by said web driving member thereby driving the rotatable reflecting member, and means bodily to move said worm axially to vary the revolving relation between the said rotatable member and said web driving member.

3. Means for observing an image of successive impressions equidistantly spaced on a printed web running in a straight observable path, including a rotatable optical rectifier having a plurality of light reflecting surfaces successively presented by its rotary movement to receive and reflect successive light rays from the moving impressions during their movement throughout the observable path, a reflecting member mounted for oscillatory movement relative to the said optical rectifier and positioned to receive light rays from the reflecting surfaces of the optical rectifier and reflect them to a fixed viewpoint convenient to the eye of an observer, means for rotating the optical rectifier in timed relation with the running web, and separate means for oscillating the reflecting member in timed relation with the operable movement of the optical rectifier and the movement of the web to correct optical errors and produce a stationary image at the said viewpoint.

4. Means for observing an image of successive impressions equidistantly spaced on a printed web running in a straight observable path, including an optical rectifier mounted for rotary movement and having a plurality of light reflecting surfaces successively presented by its rotary movement to receive and reflect in succession light rays from the moving impressions, a light reflecting member mounted for controlled oscillatory movement relative to the said optical rectifier and positioned to receive light rays therefrom and reflect them to a fixed viewpoint in an area smaller than the said observable path and convenient to the eye of an observer, means for rotating the optical rectifier in timed relation with the running web, and separate means for oscillating the reflecting member in timed relation with the operable movement of the optical rectifier and the movement of the web to correct optical errors and produce a stationary image at the said viewpoint.

5. Means for observing an image of successive impressions equidistantly spaced on a printed web running in a straight observable path, including an optical rectifier mounted for rotary movement and having a plurality of light reflecting surfaces successively presented by its rotary movement to receive and reflect in succession light rays from the moving impressions, a reflecting member mounted for variable oscillatory movement relative to the said optical rectifier and positioned to receive light rays therefrom and reflect them to a fixed viewpoint in an area smaller than the said observable path and convenient to the eye of an observer, means for uniformly rotating the optical rectifier in timed relation with the running web, and means for operably oscillating the reflecting member in timed relation with the operable movement of the optical rectifier so that the angular movement of the reflecting member is accelerated during a phase of the movement of the web through the observable path and decelerated through other phases of the movement of the web through the observable path to correct optical errors and produce a stationary image at the said viewpoint.

6. A device for observing an image of successive similar equidistant impressions printed in superposition on a web running in a straight observable path, an optical rectifier mounted for rotation and having a plurality of reflecting surfaces arranged in different planes, a light ray reflecting member mounted for cooperative oscillatory movement relative to the optical rectifier to receive light rays from the reflecting surfaces thereof and reflect them to the viewpoint of an observer in an area smaller than the said observable path, and mechanism to cooperably move the said optical rectifier and the said light ray reflecting member to maintain them in light ray receiving and reflecting positions to cause the image to appear stationary at the said viewpoint.

7. In a device for use in observing a printed impression on a web or sheet moving in a straight path, a reflecting member mounted for rotation and having a plurality of light reflecting surfaces on its periphery to reflect an image of the said impression, a gear mounted for rotation with the reflecting member, a worm mounted for rotation and axial movement and meshing with the gear to rotatably drive the reflecting member by the rotation of the worm, and means to axially move the said worm to adjustably rotate said reflecting member to thereby position the surfaces in desired relation to the impression.

8. In a device for observing printed impressions on a moving web, an optical rectifier, a light deflecting member disposed to deflect light rays from the moving impressions to the optical rectifier and the optical rectifier being constructed and arranged to reflect an image of the moving impressions to a fixed point of observation, means for mounting the deflecting member and optical rectifier for movement as a unit across the web and mounting the rectifier for movement toward and away from the deflecting member.

9. In a device for observing printed impressions on a moving web, an optical rectifier, a light deflecting member disposed to deflect light rays from the moving impressions to the optical rectifier, the optical rectifier being constructed and arranged to reflect an image of the moving impressions to a fixed point of observation, a movable frame supporting the deflecting member and the optical rectifier and mounted to move the deflecting member and optical rectifier as a unit across the web, and means for mounting the optical rectifier for movement in the frame toward and away from the deflecting member.

10. In a device for observing printed impressions on a moving web, an optical rectifier, a light deflecting member disposed to deflect light rays from the moving impressions to the optical rectifier, the optical rectifier being constructed and arranged to reflect an image of the moving impressions to a fixed point of observation, a movable frame supporting the deflecting member and the optical rectifier and mounted to move the defleting member and optical rectifier as a unit across the web, means for mounting the optical rectifier for movement in the frame toward and away from the deflecting member, and means for moving the optical rectifier toward and away from the deflecting member.

11. In a device for observing printed superposed register marks on a web moving in a straight observable path, a rotatable optical rectifier having a plurality of reflecting surfaces thereon, means to rotate the optical rectifier to reflect the light rays in succession from the moving register marks during their movement throughout the said observable path, a movable reflecting member, and independent means for moving the reflecting member relative to the reflecting surfaces of the rotatable optical rectifier and in operable relation to the moving register marks to reflect in succession light rays from the reflecting surfaces of the rotatable optical rectifier to a fixed point of observation so that a clear image of the moving register marks appear at a fixed observation point smaller than the observable path.

12. In a device for observing equidistantly spaced superposed impressions on a web moving in a straight observable path, a rotatable optical rectifier having a plurality of reflecting surfaces thereon to reflect in succession light rays from the moving impressions during their movement throughout the said observable path, a reflecting member movable relative to the reflecting surfaces of the optical rectifier and in operable relation to the moving impressions to reflect in succession light rays from the reflecting surfaces of the optical rectifier to cause an image of the moving impressions to appear stationary at a fixed point of observation.

13. In a device for observing printed impressions on a moving web, a frame mounted for movement across the web, an optical rectifier movably mounted in the frame and having a plurality of mirrors, a mirror mounted in fixed position on the frame and disposed to deflect light rays from the moving impressions to the mirrors of the rotatable optical rectifier, and the mirrors of the optical rectifier reflecting an image of the movable impressions to a fixed viewpoint of observation, the optical rectifier being movably mounted in the frame for movement toward and away from the fixed mirror.

ALBERT J. HORTON.